(12) United States Patent
Asano (10) Patent No.: US 6,435,321 B1
(45) Date of Patent: Aug. 20, 2002

(54) BRAKE CYLINDER APPARATUS

(75) Inventor: Yoshio Asano, Kobe (JP)

(73) Assignee: Nabco, LTD, Kobe (JP)

( * ) Notice: Subject to any disclaimer, the term of this patent is extended or adjusted under 35 U.S.C. 154(b) by 0 days.

(21) Appl. No.: 09/714,420

(22) Filed: Nov. 16, 2000

(51) Int. Cl.$^7$ ............................................. F16D 65/24
(52) U.S. Cl. ...................................................... 188/170
(58) Field of Search ........................................ 188/170

(56) References Cited

U.S. PATENT DOCUMENTS 3,895,695 A * 7/1975 Hunter ........................ 188/170
4,364,305 A * 12/1982 Dalibout et al. ............ 188/170
4,478,319 A * 10/1984 Casalone et al. ........... 188/170

* cited by examiner

*Primary Examiner*—Matthew C. Graham
(74) *Attorney, Agent, or Firm*—James Ray & Associates (57) ABSTRACT

A brake cylinder apparatus in which both the service brake and the spring brake, used for such things as a parking brake, can operate, and at the same time can shorten the length of the axial direction. A clutch is provided that couples the second piston with the rod when the pressurized fluid has stopped acting on the second action chamber of the spring brake and the second piston has started to move towards the rod. This clutch means comprises a screw provided on the outer circumference of the rod, a nut element supported on the second piston through the medium of a bearing such that it can rotate freely, and that meshes with the screw, and a stopping means that stops the rotation of the nut element when the second piston starts to move towards the rod.

10 Claims, 5 Drawing Sheets

Thus, the present invention takes as its purpose the provision of the brake cylinder apparatus whereby both the service brake and the spring brake used as such things as a parking brake can operate, and at the same time it can shorten the length of the axial direction.

BRAKE CYLINDER APPARATUS

FIELD OF THE INVENTION

The present invention relates, in general, to brake cylinder apparatuses whereby both the service brake and the spring brake that is used for a parking brake, etc., are capable of operation, and, in particular, relates to a brake cylinder apparatus that can shorten the length of the axial direction.

BACKGROUND OF THE INVENTION

In addition to the service brake apparatuses that act by compressed air in the platform car brake apparatuses used in railways cars, spring brake apparatuses that act by spring force are employed even when there is no compressed air in the event that one stops cars for a long period of time. When one makes this service brake apparatus and spring brake apparatus into a platform car brake apparatus that is independently installed separately, installation space becomes necessary.

Thus, a brake cylinder apparatus comprising both brake apparatuses in one unit has been developed such that an air brake apparatus and a spring brake apparatus can operate through the medium of the same piston rod.

Figure 8:
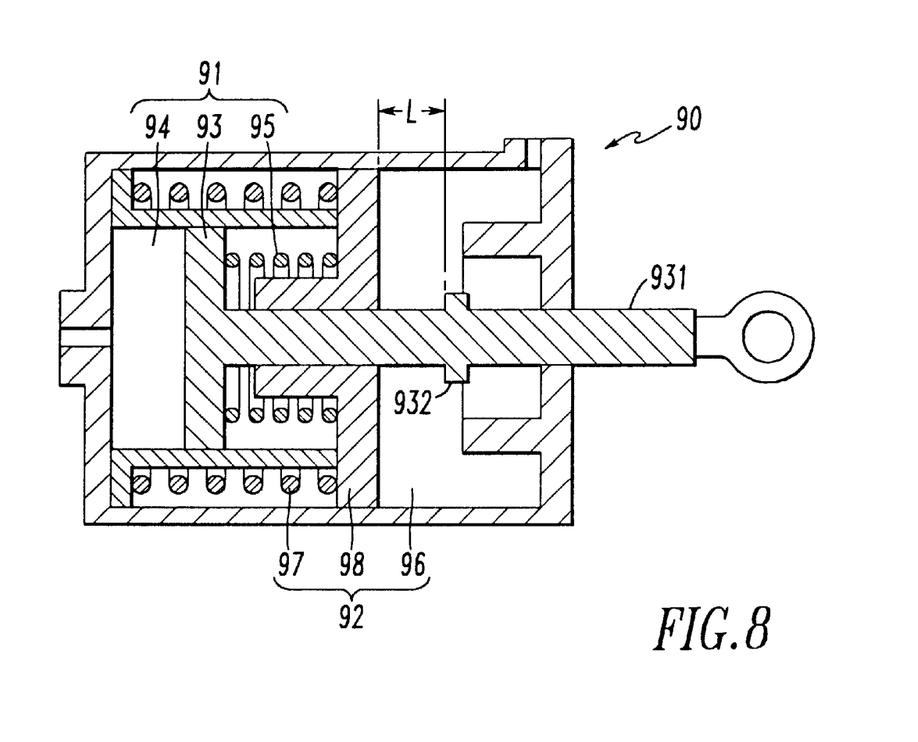
FIG. 8 is a cross-section diagram of the conventional brake cylinder apparatus.

For example, in Japan Public Patent Disclosure Bulletin S55-160646 (1980), as shown in FIG. 8, a brake cylinder apparatus with the following composition is disclosed: it is equipped with (a) a service brake means (91) that (i) possesses a first piston (93) wherein a rod (931) protrudes, and a first action chamber (94) and a first spring (95) act in opposition, and (ii) when a pressurized fluid acts on the first action chamber (94) the first piston (93) moves in the braking direction by overcoming the force applied by the first spring (95); (b) a spring brake means (92) that (i) possesses a second piston (98) wherein the rod (931) passes completely through, it has been provided such that it can move in the axial direction of the rod (931), and a second action chamber (96) and a second spring (97) act in opposition, and (ii) when a pressurized fluid stops acting on the second action chamber (96) the second piston (98) moves in said braking direction due to the force applied by the second spring (97), and a latch part (932) whereby the second piston (93) comes into direct contact with the rod (931) has been formed.

When the pressurized fluid acts on the first action chamber (94) of the service brake means (91), the first piston (98) and the rod (931) move in the braking direction in opposition to the first spring (95), and they end up in the service brake position shown in the figure. When the pressurized fluid stops acting on the first action chamber (94) of the service brake means (91) and the second action chamber (96) of the spring brake means (92) in this service brake position, the second piston (98) moves in the braking directing direction along the rod (931) due to the second spring (97). When this second piston (98) comes into direct contact with the latch part (932), the force applied by the second spring (97) is transmitted to the rod (931), and the spring brake acts in the place of the service brake.

In the event that a latch part (932) is formed on the rod (931) as in Japan Public Patent Disclosure Bulletin S55-160646 (1980), when the service brake means (91) is relaxed and the rod (931) is shortened by the force applied by the first spring (95), the latch part (932) has been provided by causing it to slide to the from end of the rod (931) so that the latch part (932) does not contact the second piston (98). Owing to this, it is necessary for the second piston (98) to move along the rod (931) by only the distance L shown in the figure, until the second piston (98) comes into direct contact with the latch part (932) of the rod (931). As a result, there is the problem that the length in the axial direction of the brake cylinder apparatus becomes longer by only a portion equivalent to the distance L.

In addition, in Japan Utility Model Disclosure Bulletin H08-5881 (1996), a brake cylinder apparatus with the following composition is proposed: a sleeve whereby one end can come into direct contact with the second piston (98), and the other end can come into contact with the step part of the large diameter part provided on the front end of the rod (931), has been fitted on the outer circumference of the rod (31), in the place of the latch part (932). However, since a sleeve whose length is such that it is possible to shorten the first piston (93) and the rod (931) can only be fitted on when the service brake means (91) is relaxed, it is necessary for the second piston (98) to operate an equivalent distance until the spring brake (92) is caused to operate, just as in Japan Public Patent Disclosure Bulletin S55-160646 (1980), and therefore there is the problem that the axial direction of the brake cylinder apparatus (90) becomes longer.

SUMMARY OF THE INVENTION

Thus, the present invention takes as its purpose the provision of the brake cylinder apparatus whereby both the service brake and the spring brake used as such things as a parking brake can operate, and at the same time it can shorten the length of the axial direction.

The invention in an embodiment that achieves the above-mentioned purposes is a brake cylinder apparatus characterized by the fact that, in a brake cylinder apparatus wherein both the service brake and the spring brake can move that is equipped with a service brake means that possesses a first piston wherein a rod protrudes. There is a first action chamber and a first spring act in opposition, and when a pressurized fluid acts on the first action chamber the first piston moves in the braking direction by overcoming the force applied by the first spring. A spring brake means that has a second piston wherein the rod passes completely through it, has been provided such that it can move in the axial direction of said rod. A second action chamber and a second spring act in opposition. When a pressurized fluid stops acting on the second action chamber the second piston moves in the braking direction due to the force applied by the second spring. A clutch means that couples the rod and the second piston when the pressurized fluid stops acting on the second action chamber and the second piston begins to move towards the rod has been provided.

Based on the above-mentioned composition, when the pressurized fluid stops acting on the second action chamber and the second piston begins to move towards the rod, the rod and the second piston are coupled by the clutch means, and the spring brake acts on the rod through the medium of the clutch means.

The invention in another embodiment is the brake cylinder apparatus composed such that the clutch means is equipped with a spring provided on one side of the rod or the second piston. A nut element is provided such that it can rotate freely on the other side of these. A stopping means stops the rotation of the nut element when the second piston begins to move towards the rod.

In the above-mentioned composition, when the rod of the first piston moves in the braking direction at the time of the action of the service brake, the nut element rotates, so the position of the second piston will not change. In addition, when the pressurized fluid stops acting on the second action chamber and the second piston begins to move towards the rod, the stopping means of the clutch means stops the rotation of the nut element, so the second piston and the rod become one, and move in the braking direction.

The invention of still another embodiment is the brake cylinder apparatus composed such that the stopping means is equipped with a sleeve element that is installed in a position opposing the nut element through the medium of a force application means, that can abrade freely in the axial direction of the rod, and whereby rotation has been stopped. A meshing means is provided on the surfaces opposing the sleeve element and the nut element, respectively.

In the above-mentioned composition, at the time of the action of the spring brake, when only the second piston moves in the braking direction while the nut element rotates, the meshing means of the nut element and the sleeve element mesh with each other, and the nut element becomes one with the sleeve element and the rotation is stopped.

The invention in yet another embodiment is the brake cylinder apparatus wherein the rotation of the sleeve means has been stopped by a lock means that can be attached and removed freely.

In the above-mentioned composition, during the action of the spring brake, when the lock means for the sleeve element is disconnected, the sleeve element and the nut element rotate, the rod can move in the anti-braking direction due to the force applied by the first spring, and the spring brake is released.

Another embodiment of the invention is the brake cylinder apparatus wherein the clutch means has been provided on the inner circumferential side of the second action chamber.

In this above-mentioned composition, the outer diameter of the second action chamber of an ordinary brake means becomes larger than the outer diameter of the first action chamber of the service brake means, so the sleeve element is provided by making use of the space of the inner circumferential side of this second action chamber.

The invention in another embodiment is the brake cylinder apparatus in which the first spring and the second spring have been installed such that they overlap in a diametrical direction.

In the above-mentioned composition, it is possible to make the service brake and the spring brake into one unit by shortening the length in the axial direction when the spring brake means and the service brake means are positioned by making them overlap in a diametrical direction.

DETAILED DESCRIPTION OF THE INVENTION

Figure 1:
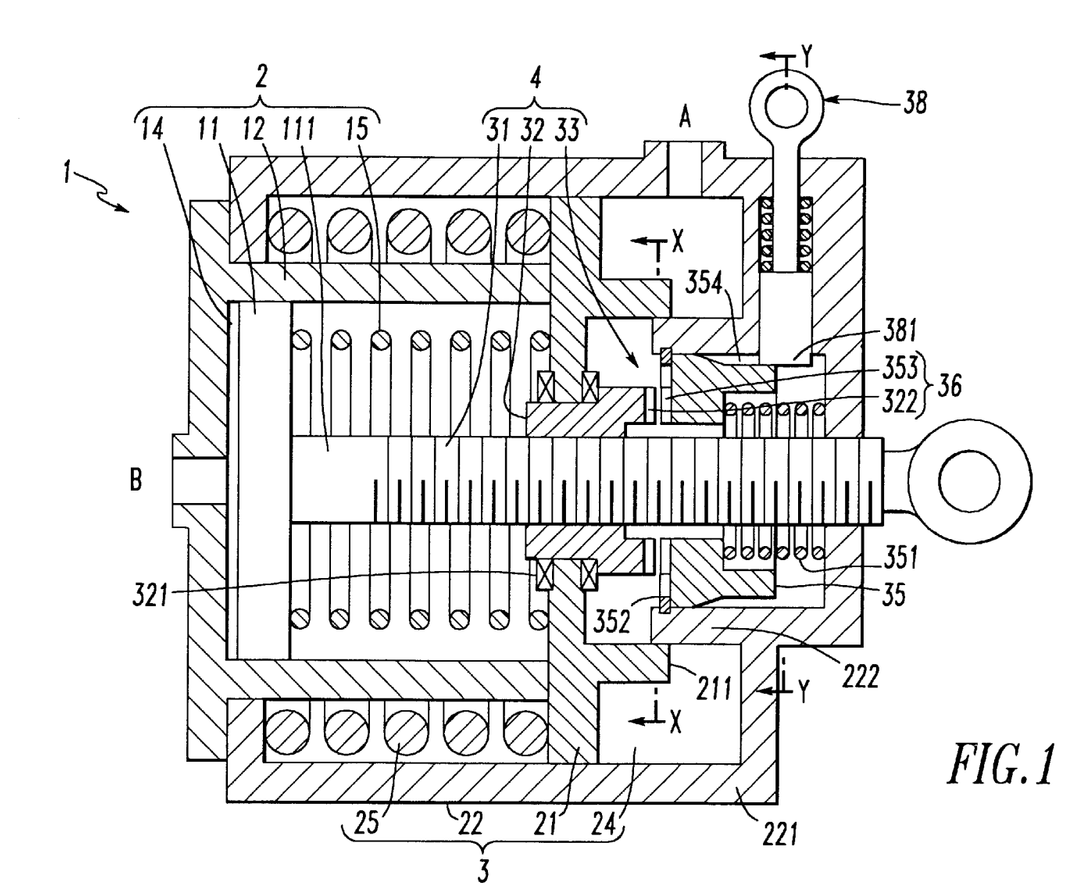
FIG. 1 is a cross section diagram showing a preferred embodiment of the brake cylinder apparatus that constitutes the present invention.
Figure 2:
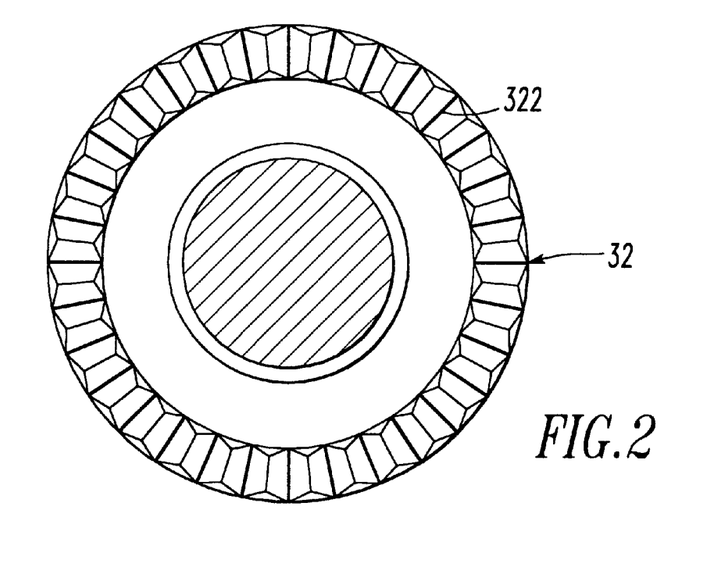
FIG. 2 is a cross section diagram along the X—X line of FIG. 1.
Figure 3:
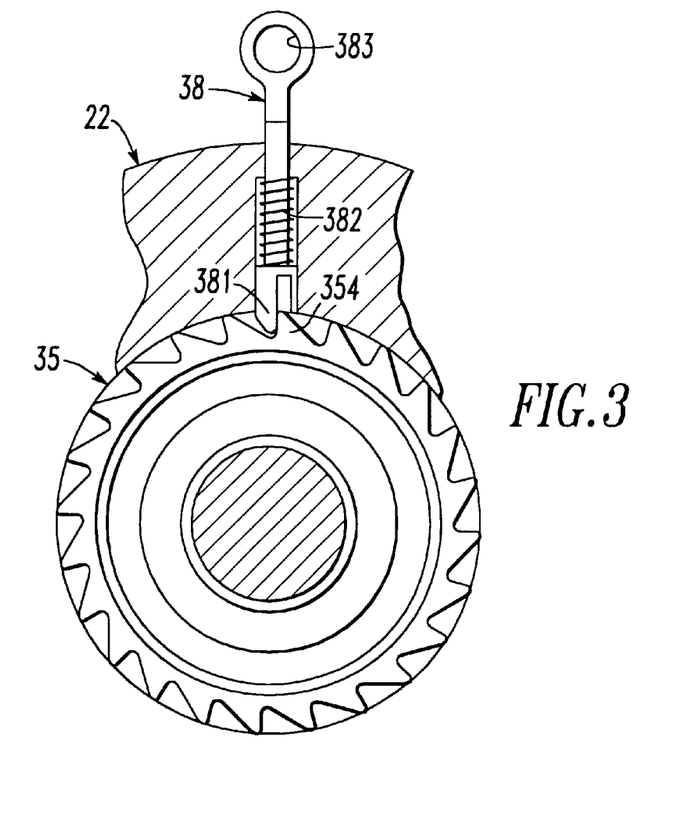
FIG. 3 is a cross section diagram along the Y—Y line of FIG. 1.

An explanation follows of a preferred embodiment of the brake cylinder apparatus that constitutes the present invention with reference to the drawing figures. FIG. 1 is a cross-section diagram of the brake cylinder apparatus for the preferred embodiment of the present invention. FIG. 2 is a cross-section diagram along the line X—X of FIG. 1. FIG. 3 is a cross-section diagram along the the line Y—Y of FIG. 2.

As seen in FIG. 1, the brake cylinder apparatus (1) comprises a clutch means (4) provided between the rod (11) of the service brake means (2) and the piston (21) of the spring brake means (3), configured such that it operates the service brake means (2) that operates by fluid pressure such as compressed air and the spring brake means (3) that operates by the force applied by the spring (25) through the medium of the same rod (111).

The service brake means (2) is composed by placing in opposition a first action chamber (14) that has a piston (11) wherein the rod (111) protrudes on one side (the braking direction) and a first cylinder (12) wherein this piston (11) is inserted such that it can abrade freely, and the other side (the anti-braking side) has been closed, and is provided between the other side of the first piston (11) and the first cylinder (12). Compressed air is supplied and discharged through the first port (B) and a first spring (15) is provided on one side of the first piston (11).

The spring brake means is composed by placing into opposition a second action chamber (24) that possesses a second piston (21) wherein the rod (111) passes completely though, and that can move in the axial direction of the rod (111), and a second cylinder (22) closed on one side with an outer casing (221) inserted such that outer circumference of the second piston (21) can abrade freely and an inner casing (222) inserted such that the inner circumference of the cylindrical projection (211) of the second piston (21) can abrade freely. Second action chamber 24 is provided between one side of the second piston (21) and the second cylinder (22). Compressed air is supplied and discharged through the second port (A) and a second spring (25) is provided between the ends of the outer casing (221), being the other side of the second piston (21).

The clutch means (4) comprises a screw (31) provided on the outer circumference of the rod (111); a nut element (32) that is supported on the second piston (21) through the medium of a bearing (321) such that it can rotate freely, and that meshes with the screw (31); and a stopping means (clutch surface) (33) that stops the rotation of the nut element (32) when the second piston (21) starts to move towards the rod (111). Now, it is acceptable for the nut element (32) to be supported such that it can rotate freely relative to the rod (111), and for a screw to be formed between the rod (111) and the second piston (21).

The stopping means (33) comprises a sleeve element (35) that faces the nut element (32) and a meshing means (36) provided on the surfaces that are opposed to the nut element (320 and the sleeve element (35). This sleeve element (35) is inserted such that it can abrade freely in an axial direction along the inner casing (222). It is impelled towards the stop-ring (352) of the other side by the spring (351), and its rotation in one direction has been stopped by the lock lever (38).

As shown in FIG. 2, the meshing means (36) comprises a concave-convex blade (322) that is formed on the surface of one side of the nut element (32) and a concave convex blade (353) that is formed on the surface of the other side of the sleeve element (35), and that possesses a shape like that in FIG. 2.

As shown in FIG. 3, a latch blade (354) extending in an axial direction on the outer circumference of the sleeve element (35) has been provided, and a blade edge (381) that is impelled in a protruding direction relative to the latch blade (354) has been provided on the front end of the lock lever (38). This latch blade (354) and blade edge (381) form a one way clutch that stops the accompanying rotation due to the rotation that accompanies the movement to one side (the braking direction) of the nut element (32), and that allows the accompanying rotation due to the rotation to the other side (the anti-braking direction) of the nut element (32).

In addition, the blade edge (381) of the lock lever (38) is impelled in the direction of the latch blade (354) by the spring (382) provided inside the second cylinder (22), and at the same time it disengages from the latch blade (354) in opposition to the force applied by the spring (382) when the eyenut (382) is pulled. Returning to FIG. 1, the latch blade (354) of the sleeve element (35) is extending in an axial direction, and the blade edge (381) of the lock lever (38) has mated with the end of one side of the latch blade (354), so even if the sleeve element (35) abrades towards one side the mating of the latch blade (354) and the blade edge (381) is maintained. The lock lever (38) possessing the function described above comprises a lock means that can be freely attached and removed and that stops the rotation of the sleeve element (35).

Figure 4:
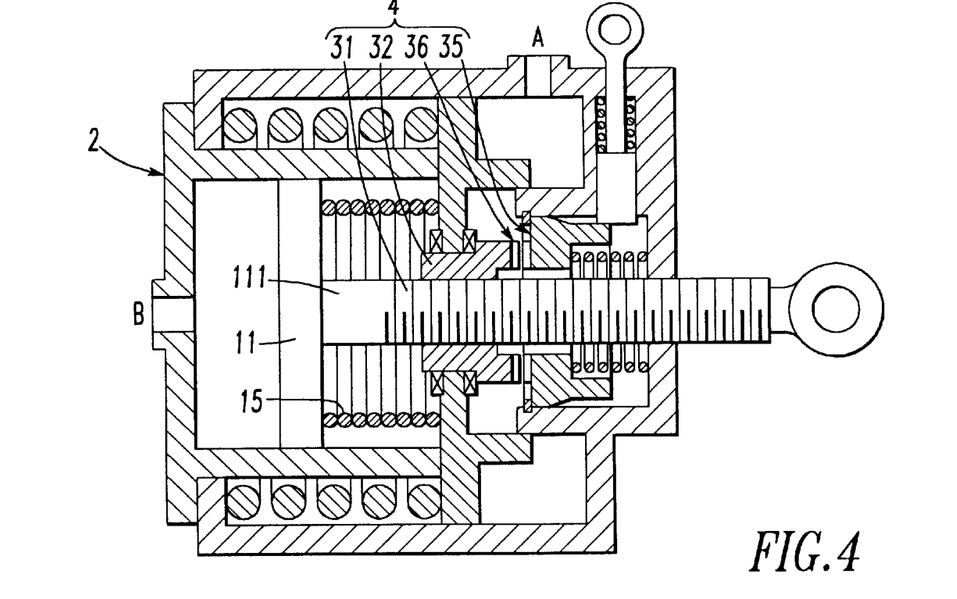
FIG. 4 is an operational explanation diagram showing the time of operation of the brake cylinder apparatus in FIG. 1 in an air brake position wherein the service brake means is operating.
Figure 5:
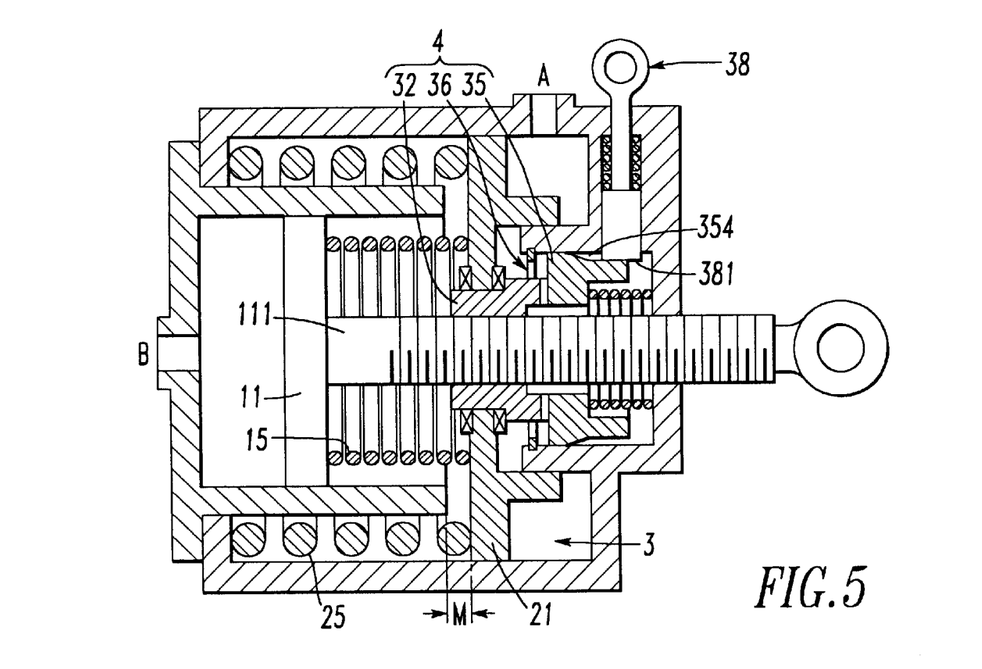
FIG. 5 is an operational explanation diagram showing the time of operation of the brake cylinder apparatus in FIG. 1 wherein the spring brake means is operating.
Figure 6:
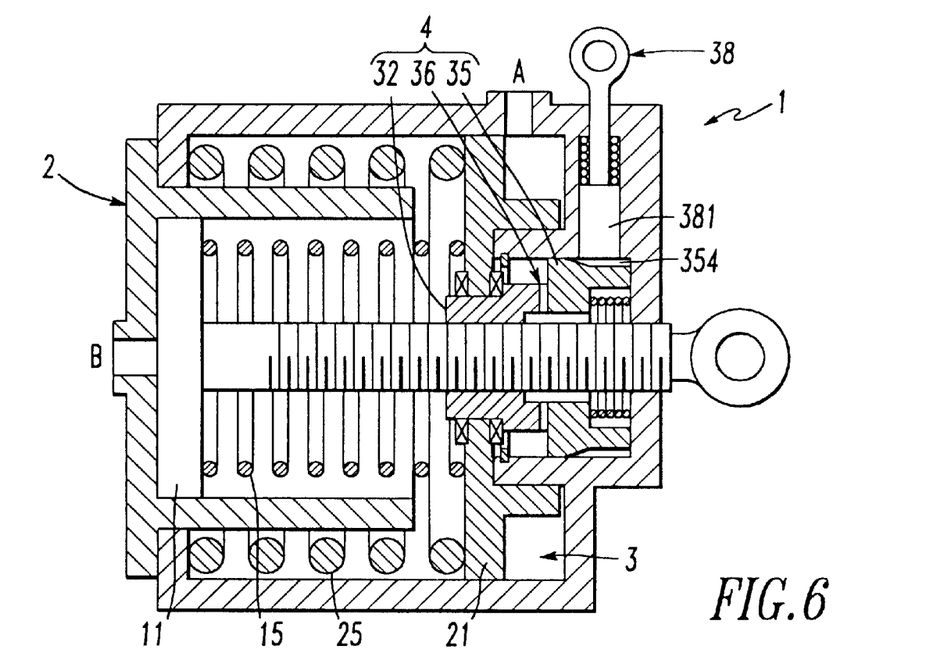
FIG. 6 is operational explanation diagram showing the time of operation of the brake cylinder apparatus in FIG. 1 wherein the spring brake means has been released manually.

An explanation follows below of the operation of the brake cylinder apparatus (1) possessing the above composition. FIG. 1 shows an operating position wherein both the service brake means (2) and the spring brake means (3) have been relaxed. FIG. 4 shows an air brake position wherein the service brake means (2) is operating. FIG. 5 shows a spring brake position wherein the spring brake means (3) is operating. FIG. 6 shows a state wherein the spring brake means (3) has been released manually.

In the operating position in FIG. 1, compressed air has been supplied to the second port (A), so the second piston (21) has been pushed in in an anti-braking direction in opposition to the force applied by the second spring (25), and it has stopped owing to contact with the end of one side of the first cylinder (12). In this relaxed position of the spring brake means (3), the meshing means (36) between the nut element (32) and the sleeve element (35) is in a meshed state separated by a slight gap, and the clutch means (41) is in a non-coupled state. In addition, since compressed air has been discharged from the first port (B), the first piston (11) is moving to the end of the other side of the first cylinder (12) due to the force applied by the first spring (15). In this relaxed state of the service brake [means] (2), the rod is in a state where it is shortened in an anti-braking direction.

In the air brake position in FIG. 4, when the compressed air is supplied to the first port (B), the first piston (11) and the rod (111) attempt to move in the braking direction in opposition to the force applied by the first spring (15). At this time, the meshing means (36) between the nut element (32) and the sleeve element (35) is in a non-meshed state, and the clutch means (4) maintains a non-coupled state. Since the nut element (32) revolves due to the screw (31) of the rod (111), the first piston (11) and the rod (111) move in the braking direction, and the required air brake force is generated.

In the spring brake position in FIG. 5, in a state wherein compressed air has been supplied to the first port (B), the compressed air of the second port (A) is discharged, and when this happens the second piston (21) attempts to move in the braking direction due to the force applied by the second spring (25). At this time, the nut element (32) moves together with the second piston (21), so the meshing means (36) between the nut element (32) and the sleeve element (35) ends up in a meshed state, that is, the clutch means (4) ends up in a coupled state, and the revolution of the nut element (32) is stopped. Now, the latch blade (354) of the sleeve element (35) latches to the blade edge (381) of the lock lever (38), and the sleeve element (35), whose revolution is still stopped, abrades in an axial direction together with the second piston (21). When this happens, the second piston (21) forms one unit with the rod (111) through the medium of the nut element (32) whose revolution has been stopped, the rod (111) maintains a state wherein it has moved in a braking direction due to the force applied by the second spring (25), and the necessary spring braking force is generated. In this spring braking position, the spring braking force is assured even if for example the compressed air that has been supplied to the first port (B) undergoes a decline in pressure due to a pipe leak.

In the event that we return from the spring brake position of FIG. 5 to the air brake position of FIG. 4, since compressed air has been supplied to the first port (B) and the second port (A), the first piston (11) maintains the air brake position shown in the figure, but the second piston (21) attempts to move in the anti-braking direction in opposition to the force applied by the second spring (25). At this time, even though the meshing means (36) between the nut element (32) and the sleeve element (35) is maintaining a meshed state, as shown in FIG. 3, the revolution in a clockwise direction wherein the nut element (32) moves in an anti-braking direction is allowed due to the fact that the latch blade (354) surmounts the blade edge (381). For this reason, the nut element (32) of FIG. 5 rotates, the second piston (21) moves towards the position of FIG. 4, and the meshing means (36) between the nut element (32) and the sleeve element (35) returns to the state of FIG. 4 that is separated.

In the spring brake position in FIG. 5, in the event that compressed air cannot be supplied due to the fact that the air compressor is broken or the pipes are damaged, etc., the spring brake force can be released manually.

In the manual release of the spring brake in FIG. 6, when the lock lever (38) is pulled in the direction of the arrows shown in the figure, the blade edge (381) disengages from the latch blade (354) of the sleeve element), and it can rotate with the meshing means (36) between the nut element (32) and the sleeve element (35) maintained in a meshed state, and the entire clutch means (4) rotates in the air. When this happens, both the first piston (11) and the second piston (21) can move up to the stroke end mutually due to the force applied by the first spring (15) and the second spring (25), and the first piston (11) and the rod (111) move in an anti-braking direction. As a result, the spring brake is released manually, and it is possible to operate the railway cars, etc.

In the brake cylinder apparatus (1) described above, as shown in FIG. 5, in the event of a switch from an air brake position to a spring brake position, the clutch means (4) operates due to the movement of the second piston (21), and the rod (111) and the second piston (21) are coupled, so the spring brake means (3) operates with the slight movement distance M of the second piston (21). For this reason, it is possible to shorten the length of the axial direction of the brake cylinder apparatus (1) wherein the service brake means (2) and the spring brake means (3) have been formed into one unit. In addition, since the second spring (25) extends by only the slight distance M and causes the specified impetus to act on the second piston (21), it is possible to use a second spring (25) with a wire diameter smaller compared with a case where it extends by a long distance and causes the specified impetus to act.

In addition, in FIG. 1, the clutch means (4) are equipped with a screw (31), a nut element (32) and a stopping means (33), the movement of the second piston (21) is converted into the revolution of the nut element (32), and the clutch means (4) ends up in a coupled state just by the stopping means (33) stopping the revolution of the nut element (32). For this reason, it sin possible to compose the clutch means (4) by a combination of mechanical parts, and thus it becomes possible to adopt a simple composition for the clutch means (4).

In addition, in FIG. 1, the stopping means (33) is equipped with a sleeve element (35) and a meshing means (36), and when the nut element (32) moves towards the sleeve element (35), the clutch means (4) ends up in a coupled state due to the meshing means (36). For this reason, the clutch means (4) operates in a reliable fashion.

In addition, in the spring brake apparatus in FIG. 5, the lock lever (lock means) (38) that stops the revolution of the sleeve element (35) is configured such that it can be attached and removed freely, so when the lock lever (38) is pulled it is easy to release the spring brake manually as in FIG. 6.

In addition, in FIG. 1, since the clutch means (4) has been provided on the inner circumferential side of the inner casing (222) of the second cylinder (22) of the spring brake means (3), it is possible to incorporate the clutch means (4) without lengthening the axial direction of the brake cylinder apparatus. Since the second cylinder (22) (the second piston, 21) ordinarily has a larger bore than the first cylinder (12) (the first piston, 11), it is possible to obtain easily the space for housing the clutch means (4) on the inner circumferential surface of the second cylinder (22).

Moreover, in FIG. 1, since the first spring (15) of the service brake means (2) and the second spring (25) of the spring brake means (3) are provided such that they overlap in a diametrical direction, it is possible to form the service brake means (2) and the spring brake means (3) into a single unit by shortening the length in the axial direction, and in addition it is possible to shorten the length in the axial direction of the brake cylinder apparatus (1) to a great degree by combining this with the shortening of the length in the axial direction based on the adoption of a clutch means (4).

Figure 7:
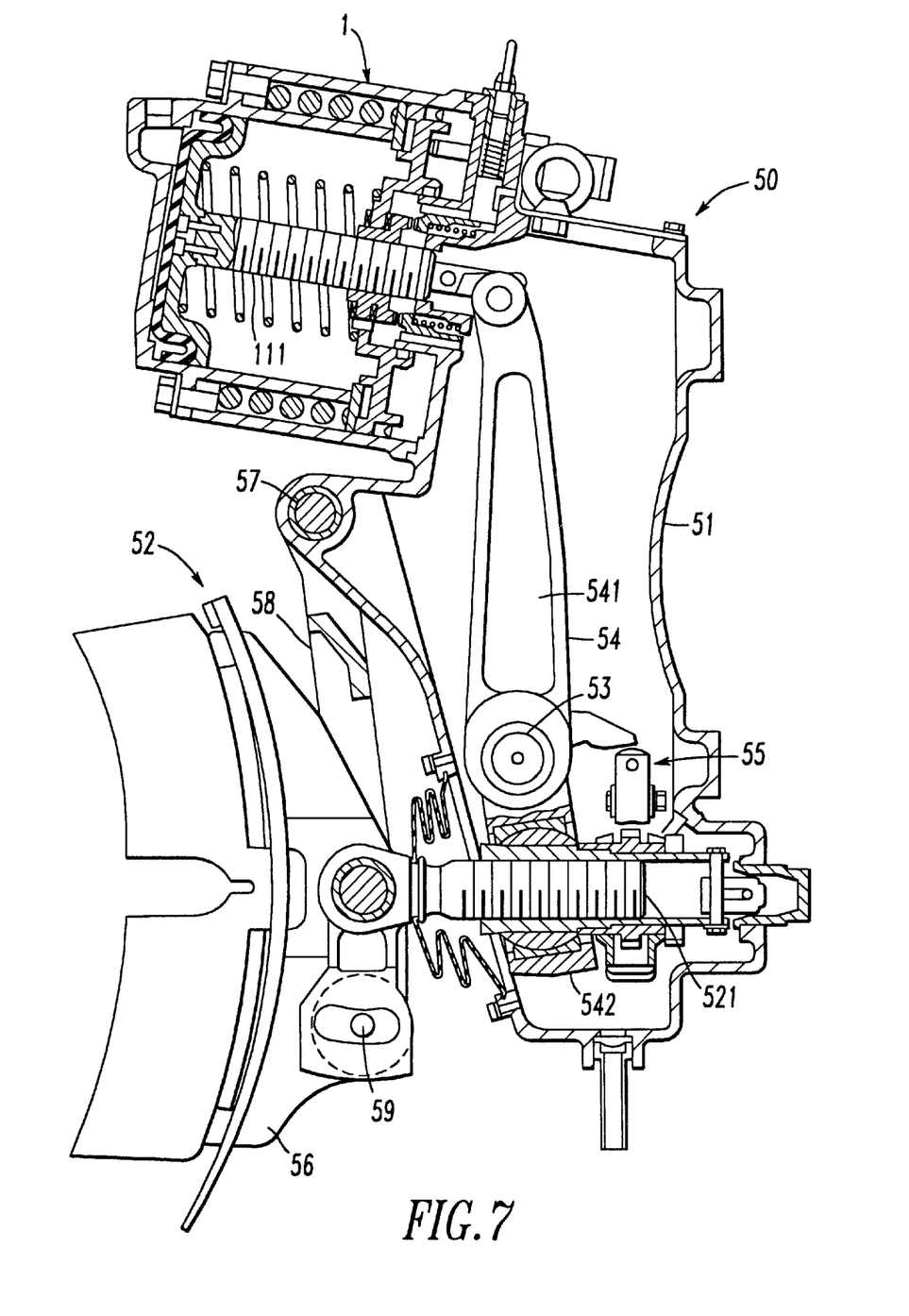
FIG. 7 is a cross section diagram of the brake apparatus used for railway cars wherein the brake cylinder apparatus that constitutes the present invention has been incorporated.

FIG. 7 shows an example of a platform car brake apparatus use for railway cars wherein a brake cylinder apparatus possessing the above-described advantages has been installed. In FIG. 7, the platform car brake apparatus is composed by installing a brake cylinder apparatus (1) at a sideways slant to the upper part of the housing (51), and by installing a brake means (52) roughly level on the lower part of the housing (51). This brake cylinder apparatus (1) and brake means (52) have been installed such that they protrude in the same direction.

Inside the housing (51), a first lever (54) that employs an shaft (53) as the intermediate support point has been built in.

The front end of the rod (111) of the brake cylinder apparatus (1) is coupled to the end of the long region (541) of this first lever (54), and the rod (521) of the brake means (52) has been supported so that it can rotate freely on the side of the short region (542) of the first lever (54) through the medium of an automatic gap adjustment mechanism (55). The brake shoe holding body (56) that is axially supported at the front end of the rod (521) of the brake means (52) holds the operating posture shown in the figure by coupling a second lever (58) that employs the shaft (57) of the housing (51) as the support point to the shaft (59) of the brake shoe holding body (56).

This kind of platform car brake apparatus used for railway cars (50) is fitted with a narrow potion of a platform car that possesses 4 wheels. For this reason, the it is necessary to form the entire platform car brake apparatus (50) in a small size, and it can be seen that using a brake cylinder apparatus (1) whose length in the axial direction has been made extremely small as shown in the figure is effective.

However, there are various embodiments for the unification of in one unit of the service brake means and the spring brake means, and thus this is not restricted to an embodiment like that in FIG. 2. Compared with the brake cylinder apparatus wherein the first spring of the service brake means and the second spring of the spring brake means are arrayed serially, as disclosed in Japan Utility Model Disclosure Bulletin H08-5881 (1996), it is possible to shorten the length in the axial direction of the brake cylinder apparatus by applying the above-described latch means.

According to the invention of a first embodiment, it is possible to shorten the length of the rod direction of the brake cylinder apparatus by the amount for which the amount of movement of the second piston is reduced, and thus miniaturization of the brake cylinder apparatus becomes possible. In addition, since the second spring that acts on the second piston extends only slightly, it is possible to use a second spring with a wire diameter that is smaller than a spring such that it can generate the prescribed impetus after extending quite a bit.

According to another embodiment of the invention it is possible to make the clutch means with a simple structure of a screw provided on one side of the rod or the second piston, and a nut element provided on the other side of these such that it can rotate freely.

According to another embodiment of the invention it is possible to cause the clutch means to operate reliably since the clutch means moves with the movement of the second piston, and couples the second piston with the rod.

In yet another embodiment of the invention at the time of the operation of the spring brake, it is possible to release the spring brake easily by manually disconnecting the lock means that stops the rotation of the sleeve element.

Still another embodiment of the invention it is possible to incorporate compactly a clutch means in a brake cylinder apparatus that combines a service brake and a spring brake in one unit, and it is possible to keep the length in the axial direction of the brake cylinder apparatus short.

According to yet another embodiment of the invention it is possible to shorten the length in the axial direction of the brake cylinder apparatus that combines a service brake and a spring brake in one unit, and it is possible to minimize the length of the axial direction of the brake cylinder apparatus conjointly with the shortening of the length in the axial direction due to the clutch means.

What is claimed is:

1. A brake cylinder apparatus, said brake cylinder apparatus comprising:

(a) a brake cylinder housing having a first port connectable to a first source of fluid pressure and a second port connectable to a second source of fluid pressure, said housing having a first aperture formed through said housing axially opposed to said first port;

(b) a service brake means disposed in said housing, said service brake means including;

(i) a first action chamber connected to said first source of fluid pressure, (ii) a first piston disposed in said first action chamber for reciprocal movement along a longitudinal axis of said brake cylinder apparatus, and (iii) a piston rod attached to a first surface of said first piston, a radially opposed second surface of said first piston facing said first port disposed in said housing;

(b) a spring brake means, said spring brake means including;

(i) a second action chamber connected to said second source of fluid pressure, (ii) a second piston disposed in said second action chamber for reciprocal movement along said longitudinal axis of said of said brake cylinder apparatus, and (iii) a second aperture disposed through a wall of said second piston transverse to said longitudinal axis of said brake cylinder apparatus wherein said piston rod is disposed for longitudinal movement through said first and said second aperture, said wall of said second piston having a first surface facing said first surface of said first piston and a radially opposed second surface of said second piston facing said second port;

(c) a first spring caged between said first surface of said first piston and said first surface of said second piston, said first spring acts in opposition to said piston rod when a pressurized fluid acts on a radially opposed second surface of said first piston, said first piston moves in a braking direction by overcoming a force applied by said first spring;

(d) a second spring caged between an inner surface of said cylinder brake housing and said first surface of second piston, said second spring acts in opposition to said second piston when such pressurized fluid stops acting on said radially opposed second surface of said first piston, said second piston moves in a braking direction due to a force applied by said second spring;

(e) a clutch means having a clutch surface is provided for coupling said rod and said second piston, said clutch means including a screw disposed on an outer circumference of said piston rod and a nut element supported on said second piston; and (f) a bearing means such that said nut can rotate freely and mesh with said screw, said clutch surface preventing rotation of said nut element when said second piston moves towards said piston rod.

2. The brake cylinder apparatus, according to claim 1, wherein said clutch means is equipped with a spring provided on at least one side of said rod and said second piston, a nut element provided such that it can rotate freely on an other side of said rod and said second piston and a clutch surface that stops rotation of said nut element when said second piston moves towards said rod.

3. The brake cylinder apparatus, according to claim 2, wherein said stopping means is equipped with a sleeve element, installed in a position opposing said nut element through a medium of a force application means, that can abrade freely in an axial direction of said rod, whereby rotation has been stopped, and a meshing means provided on surfaces opposing said sleeve element and said nut element, respectively.

4. The brake cylinder apparatus, according to claim 3, wherein rotation of said sleeve means has been stopped by a lock means that can be attached and removed freely.

5. The brake cylinder apparatus, according to claim 4, wherein said first spring and said second spring have been installed such that they overlap in a diametrical direction.

6. The brake cylinder apparatus, according to claim 3, wherein said first spring and said second spring have been installed such that they overlap in a diametrical direction.

7. The brake cylinder apparatus, according to claim 2, wherein said clutch means has been provided on an inner circumferential side of said second action chamber.

8. The brake cylinder apparatus, according to claim 7, wherein said first spring and said second spring have been installed such that they overlap in a diametrical direction.

9. The brake cylinder apparatus, according to claim 2, wherein said first spring and said second spring have been installed such that they overlap in a diametrical direction.

10. The brake cylinder apparatus, according to claim 1, wherein said first spring and said second spring have been installed such that they overlap in a diametrical direction.

* * * * *